Jan. 18, 1927.　　　　J. SCHOLTZ ET AL　　　　1,614,902
VARIABLE CONDENSER
Filed Feb. 13, 1925　　　3 Sheets-Sheet 1

WITNESSES:　　　　　　　　　　　　　INVENTORS:
　　　　　　　　　　　　　　　　　　John Scholtz
　　　　　　　　　　　　　　　　and Gustave W. Sundy
　　　　　　　　　　　　　　BY
　　　　　　　　　　　　　　　　　THEIR ATTORNEY

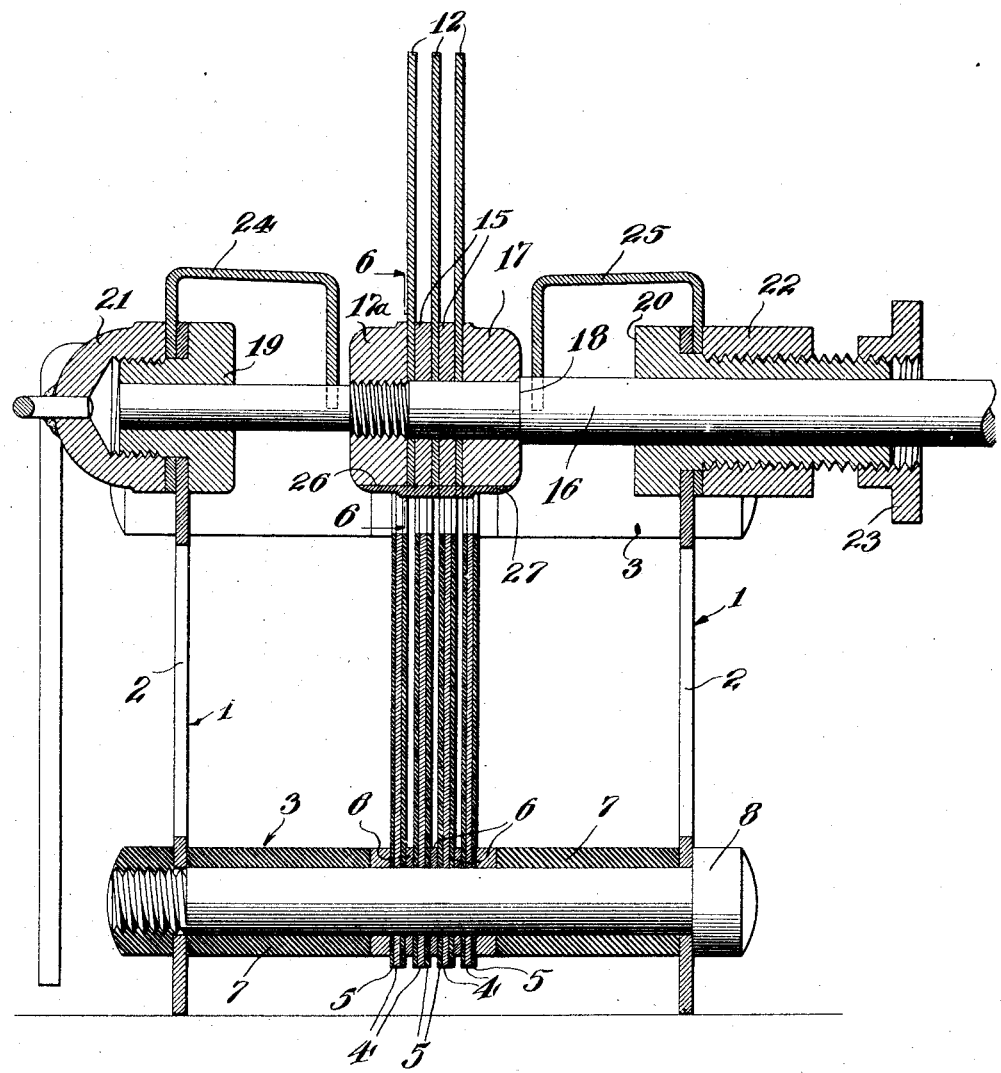

Jan. 18, 1927.
J. SCHOLTZ ET AL
1,614,902
VARIABLE CONDENSER
Filed Feb. 13, 1925      3 Sheets-Sheet 3
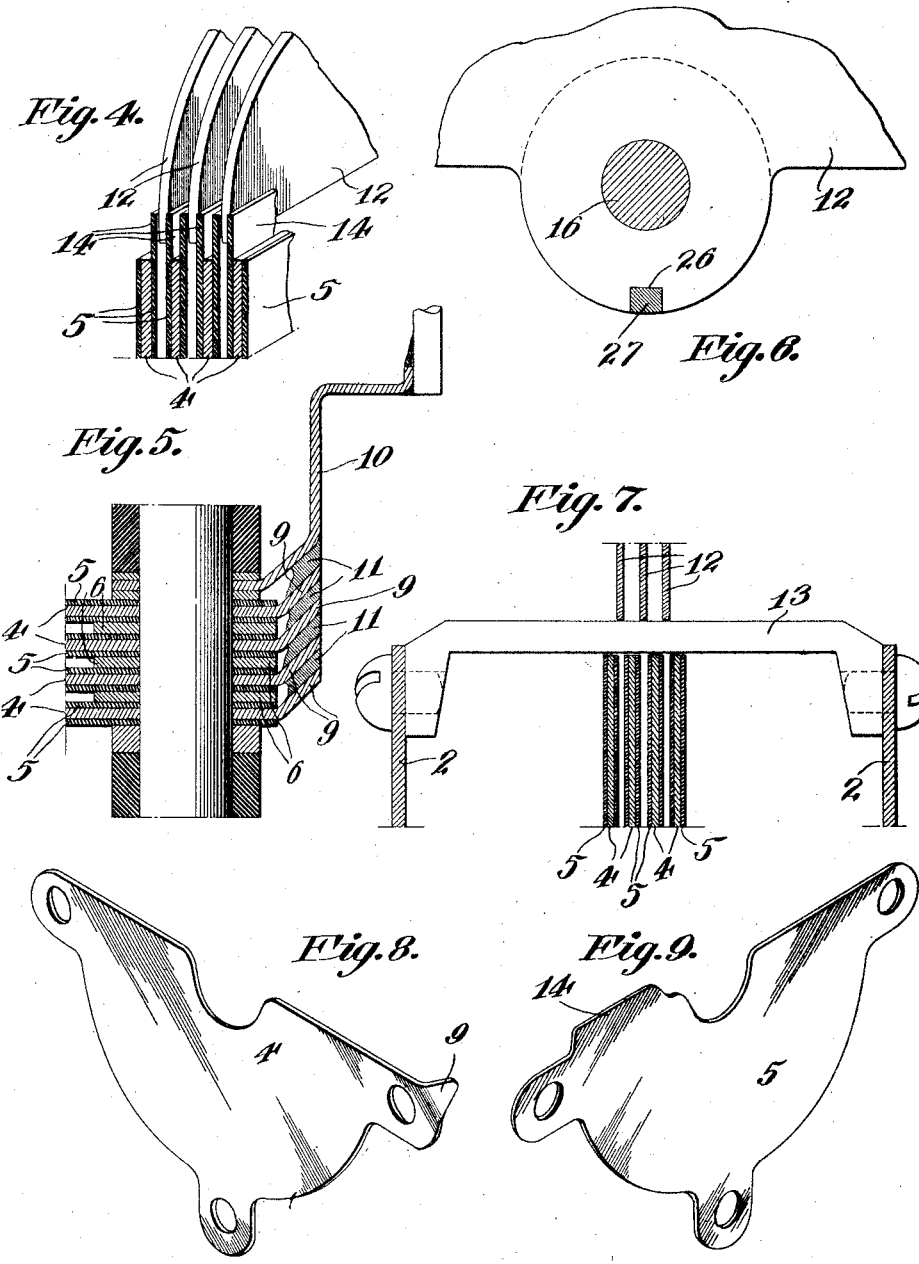

Patented Jan. 18, 1927.

1,614,902

UNITED STATES PATENT OFFICE.

JOHN SCHOLTZ AND GUSTAVE W. SUNDAY, OF PHILADELPHIA, PENNSYLVANIA.

VARIABLE CONDENSER.

Application filed February 13, 1925. Serial No. 8,870.

Our invention relates to variable condensers adapted for use in radio apparatus.

The objects are to provide a variable condenser which will be practically free of electrical losses caused by induction and mutual capacity, and which is lighter, of greater effective capacity and more compact than known condensers.

These objects and other advantageous ends which will be described hereinafter, we attain in the following manner, reference being had to the accompanying drawings in which—

Figure 1:
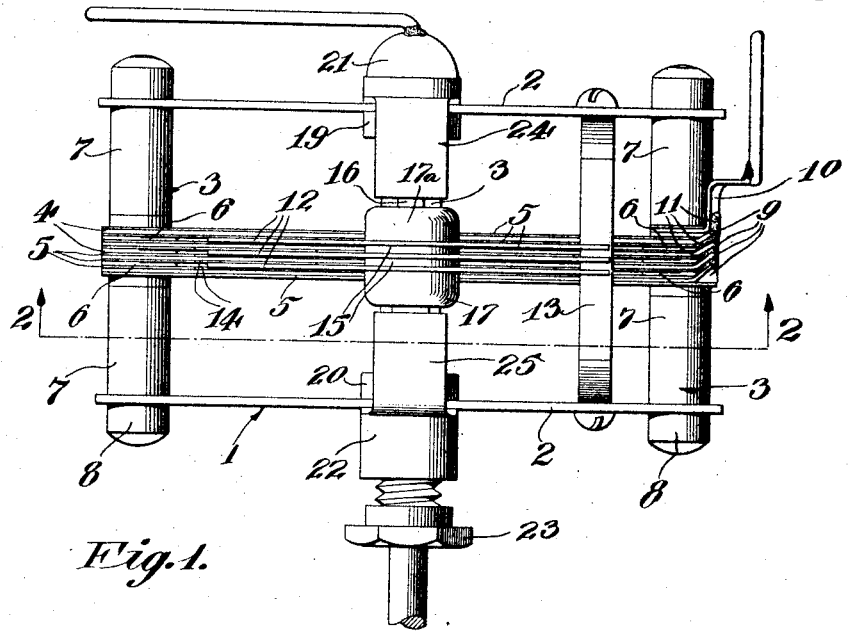
Figure 1 is a plan view of a condenser made in accordance with our invention.
Figure 2:
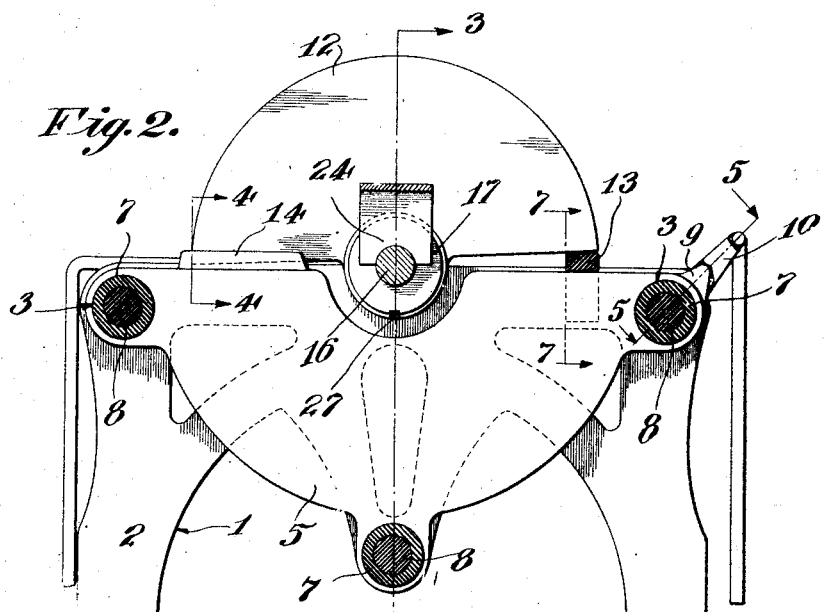
Figure 2 is a section on line 2—2 of Figure 1.

Figure 3 an enlarged section on line 3—3 of Figure 2,

Figure 4 an enlarged section on line 4—4 of Figure 2,

Figure 5 an enlarged section on line 5—5 of Figure 2,

Figure 6 an enlarged section on line 6—6 of Figure 3,

Figure 7 an enlarged section on line 7—7 of Figure 2, and

Figures 8 and 9 perspective views of elements which form a part of our invention.

Referring to the drawings, 1 indicates a frame made of a pair of metallic side plates 2 spaced from and secured to each other by ties 3. A group of stator plates 4, having their sides lined with insulating sheets 5, of mica, celluloid or other suitable material, are rigidly supported between the side plates 2 by the ties 3. Each tie is made up of a group of spacing washers 6, a pair of insulating spacing tubes 7, and an insulating tie bolt 8. The washers 6 keep each stator plate 4 and its insulating sheets 5, spaced from the adjacent stator plate and its insulating sheets. The insulated spacing tubes 7 insulate and keep the group of stator plates spaced from the metallic side plates 2. The tie bolt 8 passes through the tubes 7, washers 6, sheets 5, stator plates 4, and side plates 2, to fasten them together. The bolt 8 and spacing tubes 7 are preferably made of hard rubber.

Tongues 9 on one end of the stator plate are soldered together and to a terminal strip 10, as shown at 11 in Figure 5, to form a positive electrical connection from the terminal to each plate. Terminal strip 10 may be secured to tie 3.

A group of rotor plates 12, supported by tie plates 2, is adapted to swing between the insulating sheets 5 of the stator plates to make a condenser coupling. The rotor plates are swung from between the stator plates to make a zero coupling. They are limited in this movement by a stop bar 13 of insulating material secured to side plates 2 and extending across the path of the advance edges of the plates. The rotor plates are swung between the insulating sheets 5 of the stator plates, to make maximum coupling. At the beginning of this movement they are above the stator plates, and are guided between the stator plates by extensions 14 of insulating sheets 5, which are above the stator plates and at opposite sides of the rotor plates. Bar 13 also limits this movement of the rotor plates by obstructing the path of the advance edges of the plates.

The rotor plates are kept separated by spacer 15 therebetween. They are secured to a shaft 16 by a clamping collar 17, abutting a shoulder 18 at one side of the group of rotor plates, and a clamping collar 17ª threaded to the shaft at the other side of the group.

Shaft 16 bears in a pair of bushings 19 and 20. Bushing 19 is secured to one side plate 2 by a cap nut 21, and bushing 20 is secured to the other side plate 2 by a ring nut 22. Bushing 20 is made longer than bushing 19 to extend through a panel for securing the condenser thereto by a nut 23.

An inverted U-shaped brush 24, made from a strip of metal, has one end fitting over bushing 19 and secured to the side plate by nut 21, and the other end curved to fit the shaft 16 for making a positive electrical connection between bushing 19 and shaft 16. A similar brush 25 is likewise secured to bushing 20 and fits over shaft 16.

To insure a positive electrical connection from collars 17 and 17ª to the rotor plates, we cut a groove 26 across the collars, the spacers 15 and the rotor plates and fill it with solder 27.

For zero coupling, rotor plates 12 are swung out from between the stator plates 4.

This movement is stopped by bar 13 which is in the path of the rotor plates, as shown in Figure 2.

For maximum coupling, the rotor plates are swung in between the stator plates until the advance edges of the rotor plate abut bar 13. At the beginning of this movement the advance edges are above the stator plates and are guided between these plates by the extensions 14 of the insulating sheets 5.

Current passes from terminal strip 10 to each of the stator plates through the solder 11 and tongues 9.

Current passes from cap nut 21, which serves as a terminal to the rotor plates, through brush 24, shaft 16 and solder 27, and through brush 25 to its side plate 2.

The condenser above described, when used in a radio receiver, is sensitive for tuning in radio waves of different lengths, and causes the distant broadcast matter recorded to be loud and clear.

While we have described our invention as taking a particular form, it will be understood that the various parts may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A variable condenser including a pair of side plates; electrically connected stator plates; insulating sheets covering the opposed faces of the plates; insulating means securing the stator plates and sheets to the side plates; rotor plates mounted on the side plates to swing between the sheets; guide lugs extending from the sheets beyond the stator plates, and an insulating stop on the side plates adapted to limit the swing of the rotor plates when swung entirely in between the sheets, and when swung out of between the sheets and positioned partly in between the guide lugs.

2. In a variable condenser having a frame, rotor plates and stator plates; spacing washers between the stator plates, insulating spacing tubes between the stator plates and the sides of the frame, and an insulating rod passing through the frame, tubes, washers and stator plates for securing them together.

3. In a variable condenser having a frame, rotor plates and stator plates; insulating sheets between the stator and rotor plates; spacing washers between the sheets; insulating tubing between the stator plates and the sides of the frame, and an insulating tie rod passing through the frame, insulating tubing, spacing washers, sheets and stator plates for securing them together.

4. In a variable condenser having a frame and stator plates secured thereto; a shaft rotatably mounted in the frame; rotor plates on the shaft; spacers between the rotor plates; clamping collars for clamping the rotor plates against the spacers, the collars, the spacers and the rotor plates forming a hub and having a groove therein, and solder in the groove.

5. In a variable condenser including a frame having metallic sides; stator plates secured to the frame; a bushing in each side of the frame; a shaft rotatable in the bushings; rotor plates on the shaft adapted to swing between the stator plates; a brush on each bushing contacting with the shaft, and a nut clamping the brush and bushing to the side of the frame.

In testimony whereof we have signed our names to this specification.

JOHN SCHOLTZ.
GUSTAVE W. SUNDAY.